H. D. REY.
VEHICLE WHEEL.
APPLICATION FILED JULY 1, 1918.
1,313,913.
Patented Aug. 26, 1919.
2 SHEETS—SHEET 1.
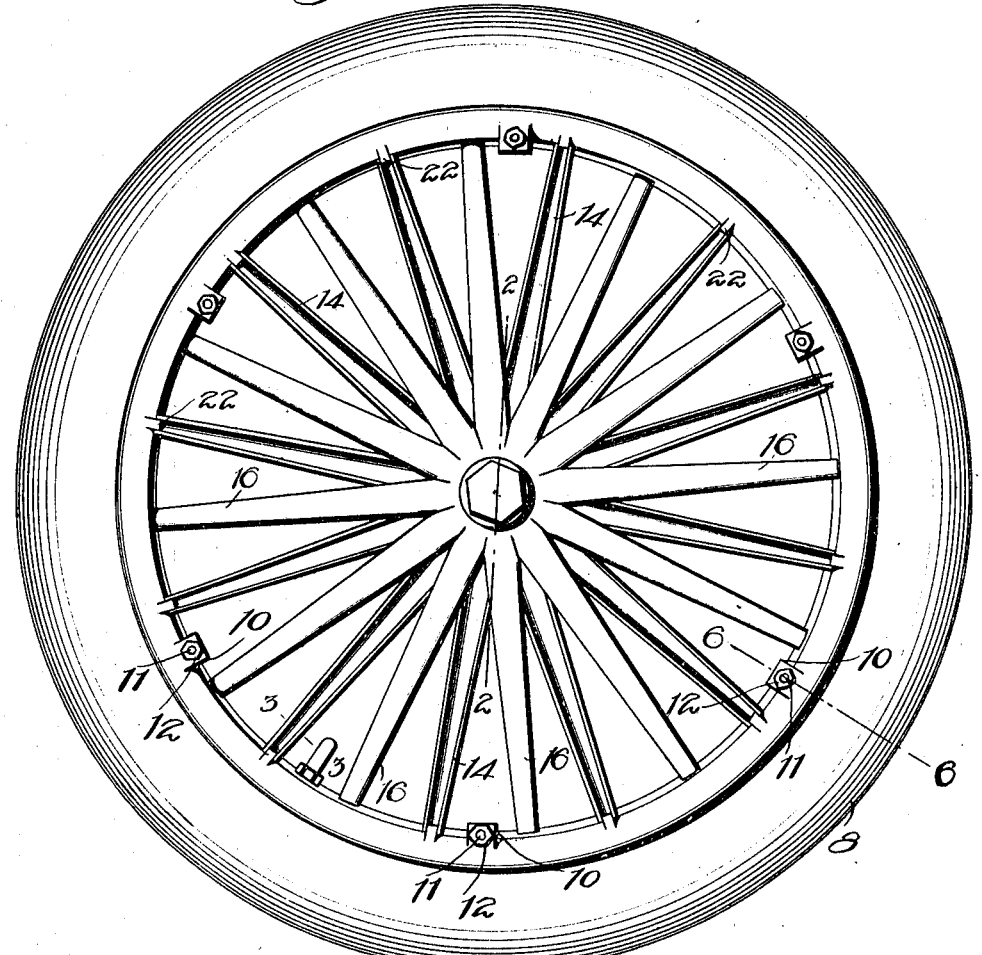
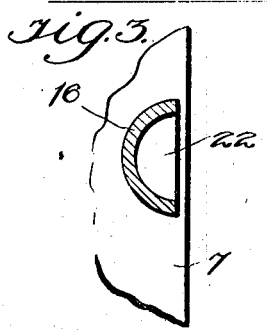
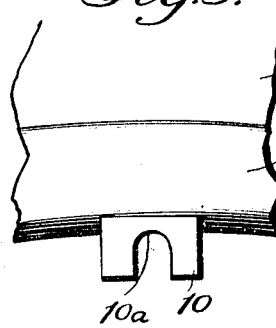
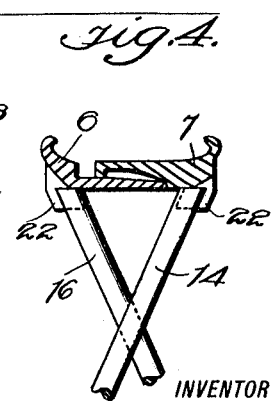
WITNESSES
INVENTOR
HENRI D. REY,
BY
ATTORNEYS H. D. REY.
VEHICLE WHEEL.
APPLICATION FILED JULY 1, 1918.
1,313,913.
Patented Aug. 26, 1919.
2 SHEETS—SHEET 2.
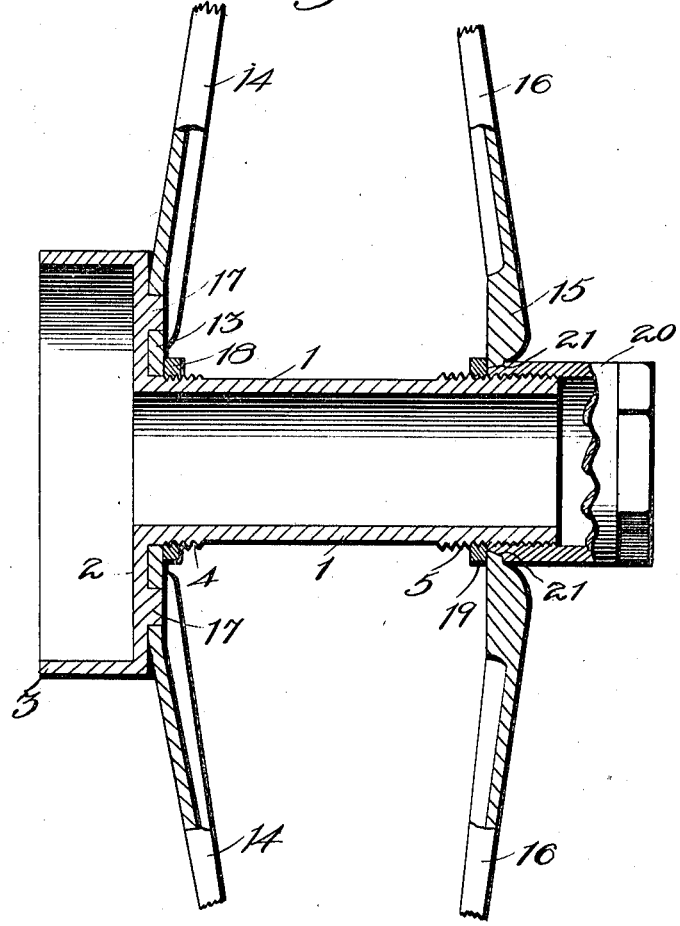
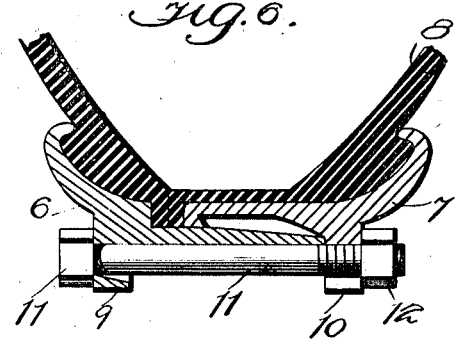
WITNESSES
INVENTOR
Henri D. Rey,
BY
ATTORNEYS

UNITED STATES PATENT OFFICE.

HENRI D. REY, OF AVARUA, ISLAND OF RAROTONGA, COOK ISLANDS.

VEHICLE-WHEEL.

1,313,913.  Specification of Letters Patent.  Patented Aug. 26, 1919.

Application filed July 1, 1918. Serial No. 242,784.

*To all whom it may concern:*

Be it known that I, HENRI DANIEL REY, a citizen of the Republic of France, and a resident of Avarua, in the island of Rarotonga, one of the Cook Islands, within the boundaries of New Zealand, have invented certain new and useful Improvements in Vehicle-Wheels, of which the following is a specification.
My invention is an improvement in vehicle wheels, and has for its object to provide a wheel of the character specified adapted for use in vehicles, and arranged to permit a quick and easy assembling and disassembling of the wheel, the wheel being composed of a rim, a hub and two series of spokes connecting the hub and the rim, each series of spokes being an integral structure and so braced against the hub and the rim as to give a maximum of resistance.

A further object of the invention is to provide a wheel of light yet strong construction, that may be cheaply and quickly made and wherein the use of a felly may be dispensed with.

In the drawings:

Figure 1 is a side view of the improved wheel;

Figs. 2, 3 and 6 are sections on the lines 2—2, 3—3 and 6—6, respectively, of Fig. 1;

Fig. 4 is a sectional view through the rim showing the arrangement of the spokes at the rim;

Fig. 5 is a partial side view of the rim.
In the present embodiment of the invention, the hub 1 is provided, having at one end a radially extending flange 2, which has a marginal rib 3 forming a brake disk. The periphery of the hub is threaded externally adjacent to the flange 2, as indicated at 4, and at the opposite end as indicated at 5, and the rim is a sectional rim, of the character shown and described in my co-pending applications Serial No. 237,241, filed May 29, 1918, and Serial No. 241,770, filed June 25, 1918.

The said rim consists of sections 6 and 7, each of which has a hooked flange, as shown, for engaging the holding rib of the shoe or casing 8, and the sections 6 and 7 have abutting faces which engage the edges of the shoe or casing to clamp the said edges together, in the manner and for the purpose set forth in the said prior applications. The sections 6 and 7 of the rim have at spaced intervals inwardly extending lugs 9 and 10, and bolts 11 are passed through registering openings in the lugs to clamp the sections together, each bolt being engaged by a nut 12.

Referring to Fig. 6 it will be seen that the opening of the lug 9 of the section 6 tapers, gradually increasing in radial diameter from without inward. The lugs 10 of the sections 7 have notches or recesses 10$^a$, as shown more particularly in Fig. 5, and it will be obvious that when the nuts 12 are loosened the threaded ends of the bolts may swing radially inward, to permit the removal of the section 7 of the rim without disturbing the section 6, and without necessitating the entire removal of the nuts 12.

There are two series of spokes, one series consisting of a central hub portion 13 and spokes 14, the other consisting of a hub portion 15 and spokes 16, the spokes in both instances being integral with the hub portions and radiating therefrom. The flange 2 has lugs 17 extending inwardly toward the opposite end of the hub 1, and the hub portion 13 has openings for receiving these pins or lugs. It will be noticed that the hub has a plain portion adjacent to the flange 2, and the hub portion 13 engages this plain portion. The collar 18 is threaded onto the threaded portion 4 of the hub and clamps the hub portion 13 tightly against the flange 2, preventing disengagement of the pins 17 from the openings.

A collar 19 is threaded on to the threaded portion 5 of the hub, and the inner face of the hub portion 15 bears against this collar. It will be noticed from an inspection of Fig. 2 that the opening for the hub 1 in the hub portion 15 of the outer series of spokes is of greater diameter than the diameter of the hub and the edge of the opening is beveled outwardly, as shown.

A nut 20 in the form of a cap is threaded on to the threaded portion 5 of the hub 1, and this cap has at its inner edge a beveled surface which engages within the opening of the hub portion 15 of the outer series of spokes, a shoulder 21 being formed at the outer end of the beveled portion, which bears against the hub portion 15, clamping the same between the collar 19 and the nut. It will be noticed that the threaded portion 5 is of considerable length, providing for adjustment of the outer series of spokes toward and from the inner series for different size rims. Each spoke, as shown in Figs. 1, 2 and 3, is curved transversely, and at their outer ends the spokes of both series engage lugs 22 on the rim sections 6 and 7. These lugs extend radially inward as shown, and they have a curved face fitting the concave surface of the spoke. The spokes 16 of the outer series alternate with respect to the spokes 14 of the inner series, and near their outer ends the spokes of the two series are crossed, the spokes 16 engaging the lugs 22 of the rim section 6, while the spokes 14 engage the lugs 22 of the rim section 7.

To assemble the wheel, the inner series of spokes, which may be considered as the inner face of the wheel, is pushed over the hub and correctly positioned on the plain portion of the hub adjacent to the flange 2, and the collar 18 is threaded into engaging position with respect to the said inner face of the wheel. The collar 19 is now placed and the outer series of spokes, or the outer half of the wheel, is then placed over the hub and the cap nut is turned into position on the hub with its inner end engaging within the opening of the said outer face of the wheel.

The rim is now pushed on over the spoke ends so that the ends of the spokes belonging to the inner face of the wheel engage correctly the lugs 22 of the section 7 of the rim. The outer face of the wheel is now rotated manually a short distance, until the ends of the spokes correctly engage against the lugs 22 of the section 6 of the rim, after which the cap nut 20 is turned into the proper position, the collar 19 being afterward adjusted to the proper degree of tension. The rim will be firmly and properly held in place and the whole wheel will be as rigid as if of one piece. In order to demount the rim it is only necessary to loosen the nut 20, after which the outer face of the wheel may be pulled outwardly and rotated slightly to permit the spoke ends to clear the lugs 22. The metal rim with the tire may now be demounted by an outward pull. A reversal of these movements will mount the rim or disassemble the wheel.

I claim:

1. A wheel comprising a hub and a rim, and a body portion connecting the hub and the rim, the hub having at one end a radial flange, the flange having lugs extending toward the hub, the body of the wheel being composed of inner and outer faces dished in opposite directions, the faces having central openings for the hub and the inner faces having openings for the lugs, stop collars threaded on to the hub at the inner sides of the wheel faces, a nut threaded on to the hub outside of the outer face, each face consisting of a single hub portion and radiating spokes, the spokes of each series being curved tranversely in the same direction and arranged with their concave faces inward, and the spokes of the series crossing near their outer ends and being alternately arranged, the rim having at each side edge a series of inwardly extending radial lugs engaged by the ends of the spokes of the opposite series, the rim being sectional, and means between the spokes for clamping the sections together.

2. A wheel comprising a hub and a rim and a body portion connecting the hub and the rim, the hub having at one end a radial flange, the flange having lugs extending toward the hub, the body of the wheel being composed of inner and outer faces dished in opposite directions, the faces having central openings for the hub and the inner faces having openings for the lugs, stop collars threaded on to the hub at the inner sides of the wheel faces, a nut threaded on to the hub outside of the outer face, each face consisting of a single hub portion and radiating spokes, the spokes of each series being curved transversely in the same direction and arranged with their concave faces inward, and the spokes of the series crossing near their outer ends and being alternately arranged, the rim having at each side edge a series of inwardly extending radial lugs engaged by the ends of the spokes of the opposite series.

3. A wheel comprising a hub and a rim and a body portion connecting the hub and the rim, the hub having at one end a radial flange, the flange having lugs extending toward the hub, the body of the wheel being composed of inner and outer faces dished in opposite directions, the faces having central openings for the hub and the inner faces having openings for the lugs, stop collars threaded on to the hub at the inner sides of the wheel faces, a nut threaded on to the hub ouside of the outer face, each face consisting of a single hub portion and radiating spokes, the spokes of each series being curved transversely in the same direction and arranged with their concave faces inward, and the spokes of the series crossing near their outer ends and being alternately arranged.

4. A wheel comprising a hub and a rim and a body portion connecting the hub and the rim, the hub having at one end a radial flange, the flange having lugs extending toward the hub, the body of the wheel being composed of inner and outer faces dished in opposite directions, the faces having central openings for the hub and the inner faces having openings for the lugs, stop collars threaded on to the hub at the inner sides of the wheel faces, and a nut threaded on to the hub outside of the outer face.

5. A wheel comprising a hub, a rim and a plurality of series of integrally connected spokes of sheet metal connecting the hub and the rim, the integral connection of each series being at the hub, and having an opening for receiving the hub, means for rigidly connecting one series of spokes to one end of the hub, means for adjustably connecting the other series to the other end, said other series being adjustable angularly and longitudinally of the hub, the rim having series of lugs at each side edge for engagement by the outer ends of the spokes, the spokes of one series crossing the spokes of the other series near the rim, the rim being sectional, and means for clamping the sections together.

6. A wheel comprising a hub, a rim and a plurality of series of integrally connected spokes connecting the hub and the rim, the integral connection of each series being at the hub and having an opening for receiving the hub, means for rigidly connecting one series of spokes to one end of the hub, means for adjustably connecting the other series to the other end, said other series being adjustable angularly and longitudinally of the hub, the rim having series of lugs at each side edge for engagement by the outer ends of the spokes, the spokes of one series crossing the spokes of the other series near the rim.

7. A wheel comprising a hub, a rim and a plurality of series of integrally connected spokes connecting the hub and the rim, the integral connection of each series being at the hub and having an opening for receiving the hub, means for rigidly connecting one series of spokes to one end of the hub, and means for adjustably connecting the other series to the other end, said other series being adjustable angularly and longitudinally of the hub.

8. In a wheel, a hub and a rim, a body composed of similar sections, each section having radiating spokes, means for rigidly connecting one section to one end of the hub, means for adjustably connecting the other section to the other end to be adjusted angularly and longitudinally of the hub, the rim having lugs for engagement by the ends of the spokes, and said spokes crossing near the rim.

9. In a wheel, a hub and a rim, a body composed of similar sections, being of integral sheet metal and each section having radiating spokes, means for rigidly connecting one section to one end of the hub, means for adjustably connecting the other section to the other end to be adjusted angularly and longitudinally of the hub, the rim having lugs for engagement by the ends of the spokes, the angular adjustment permitting the spokes to be engaged and disengaged from the lugs.

10. In a wheel, a hub and a rim, a body composed of similar sections, each section being of integral sheet metal and having radiating spokes, means for connecting the sections to the hub for adjustment angularly thereof, the rim having lugs for engagement by the ends of the spokes, the angular adjustment permitting the engagement and disengagement of the spokes with the lugs.

HENRI D. REY.